US012169636B2

(12) United States Patent
Jung et al.

(10) Patent No.: US 12,169,636 B2
(45) Date of Patent: Dec. 17, 2024

(54) COMPUTATIONAL SSD ACCELERATING DEEP LEARNING SERVICE ON LARGE-SCALE GRAPHS

(71) Applicant: KOREA ADVANCED INSTITUTE OF SCIENCE AND TECHNOLOGY, Daejeon (KR)

(72) Inventors: Myoungsoo Jung, Daejeon (KR); Miryeong Kwon, Daejeon (KR); Donghyun Gouk, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 53 days.

(21) Appl. No.: 18/151,645

(22) Filed: Jan. 9, 2023

(65) Prior Publication Data

US 2023/0221876 A1 Jul. 13, 2023

(30) Foreign Application Priority Data

Jan. 10, 2022 (KR) .................. 10-2022-0003627
Oct. 17, 2022 (KR) .................. 10-2022-0133576

(51) Int. Cl.
*G06F 3/06* (2006.01)
(52) U.S. Cl.
CPC ............ *G06F 3/0644* (2013.01); *G06F 3/061* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,394,746 B2 | 8/2019 | Kachare et al. | |
| 10,585,819 B2 | 3/2020 | Kachare et al. | |
| 11,126,359 B2 | 9/2021 | Elyasi et al. | |
| 11,232,156 B1 | 1/2022 | Wang et al. | |
| 2019/0050715 A1* | 2/2019 | Ooi .................. | G06N 3/063 |
| 2020/0364338 A1* | 11/2020 | Ducau .................. | G06F 21/564 |
| 2021/0174202 A1 | 6/2021 | Hong | |

(Continued)

FOREIGN PATENT DOCUMENTS

| KR | 10-2019-0040884 A | 4/2019 |
|---|---|---|
| KR | 10-2019-0105496 A | 9/2019 |

(Continued)

OTHER PUBLICATIONS

Asmaa Rassil et al., "Holistic Graph Neural Networks based on a global-based attention mechanism", Science Direct, Knowledge-Based Systems, Mar. 15, 2022, 108105, pp. 1-8, vol. 240.

(Continued)

*Primary Examiner* — Charles J Choi
(74) *Attorney, Agent, or Firm* — Sughrue Mion, PLLC (57) ABSTRACT

A computational storage supporting graph machine learning acceleration includes a solid state drive (SSD) configured to store a graph data set; and a field-programmable gate array (FPGA) configured to download, to a memory, a graph machine learning model programmed in a form of a data flow graph by a host, wherein a hardware logic built in the FPGA performs access to the SSD through a peripheral component interconnect-express (PCIe) switch.

15 Claims, 10 Drawing Sheets

(56) References Cited

U.S. PATENT DOCUMENTS

2024/0007955 A1\* 1/2024 Turullols ................ G06F 1/324

FOREIGN PATENT DOCUMENTS

| KR | 10-2020-0070116 A | 6/2020 |
| KR | 10-2021-0073242 A | 6/2021 |

OTHER PUBLICATIONS

Miryeong Kwon et al., "Hardware/Software Co-Programmable Framework for Computational SSDs to Accelerate Deep Learning Service on Large-Scale Graphs", Proceedings of the 20th USENIX Conference on File and Storage Technologies, Feb. 22-24, 2022, 978-1-939133-26-7, pp. 1-17.
Communication dated Apr. 29, 2024, issued in Korean Application No. 10-2022-0133576.

\* cited by examiner

```
1  Graph = g;
2  Batch = g.CreateIn()
3  Weight = g.CreateIn()
4  SubG,SubE = g.CreateOp("Batchpre",Batch)
5  Spmm = g.CreateOp("SpMM_Mean",SubG,SubE)
6  Gemm = g.CreateOp("GEMM",Spmm,Weight)
7  Subembed = g.CreateOp("ReLU",Gemm)
8  Result = g.CreateOut()
```

| Device table | |
|---|---|
| Name | Priority |
| "CPU" | 50 |
| "Vector processor" | 150 |
| "Systolic array" | 300 |
| ... | ... |

| Operation table | |
|---|---|
| Name | C-kernel |
| "GEMM" | <"CPU", ptr> |
|  | <"Vector processor", ptr> |
|  | <"Systolic array", ptr> |
| ... | ... |

FIG. 10

COMPUTATIONAL SSD ACCELERATING DEEP LEARNING SERVICE ON LARGE-SCALE GRAPHS

CROSS-REFERENCE TO RELATED APPLICATIONS

This application is based on and claims priority under 35 U.S.C. § 119 to Korean Patent Application Nos. 10-2022-0003627, filed on Jan. 10, 2022, and 10-2022-0133576, filed on Oct. 17, 2022, in the Korean Intellectual Property Office, the disclosures of which are incorporated by reference herein in their entirety.

BACKGROUND

1. Field

The disclosure relates to a computational storage supporting graph machine learning acceleration, and more particularly, to a computational solid state drive (SSD) accelerating deep learning service on large-scale graphs.

2. Description of the Related Art

Graph-based neural network learning models, that is, graph neural networks (GNNs), unlike existing neural network-based machine learning techniques, may express correlations between pieces of data and thus are used in a wide range of fields and applications, from large-scale social network services (SNS), such as Facebook, Google, LinkedIn, and Uber, to navigation and drug development. When analyzing a user network stored in a graph structure, realistic product and item recommendations, friend recommendations as inferred by people, etc. that were not possible by existing neural network-based machine learning are possible using the graph-based neural network learning models, that is, the GNNs.

In the past, in order to perform such GNN machine learning, efforts were made to accelerate a GNN inference process by using a system used for neural network-based machine learning, such as a data processing unit (DPU) or a graphics processing unit (GPU). However, in a GNN preprocessing process, such as loading graph data from storage to memory and sampling the graph data, there are serious bottlenecks and a lack of memory, which limits a practical system application.

SUMMARY

An embodiment of the disclosure provides a computational storage, i.e., a computational solid state drive (SSD), capable of accelerating the entire GNN process by accelerating not only a GNN inference process but also a GNN preprocessing process.

Another embodiment of the disclosure provides a computational storage, i.e., a computational SSD, capable of programming a graph machine learning model for supporting various hardware structures and software required for GNN preprocessing and GNN inference.

Additional aspects will be set forth in part in the description which follows and, in part, will be apparent from the description, or may be learned by practice of the presented embodiments of the disclosure.

According to an embodiment of the disclosure, a computational storage supporting graph machine learning acceleration includes: an operation unit disposed near a storage; a graph storage unit configured to store a graph data set in the storage or provide an interface for accessing the graph data set and output the graph data set and metadata for managing the graph data set; a graph execution unit configured to convert a graph machine learning model programmed by a host in a form of a data flow graph into a data flow graph having a preset format, download the data flow graph having the preset format to a memory of the operation unit, and execute the downloaded data flow graph to perform graph machine learning preprocessing and graph machine learning inference; and an accelerator generation unit configured to download a bit file of the host, set a setting memory value based on the bit file to design a hardware logic of the operation unit, and generate a graph machine learning inference accelerator.

The operation unit may be divided into a first area and a second area, and the first area and the second area may be provided with a coprocessor port and a system bus lane to program the second area.

The first area may be a fixed area and include a hardware logic used when executing the graph storage unit, the graph execution unit, and the accelerator generation unit. The second area may be a dynamically programmable area, and a user may define, in the second area, an operation executable in hardware through the graph execution unit.

The graph storage unit may be further configured to perform a process of converting a graph into a graph structure, which is easy to search for neighbors, when storing the graph included in the graph data set, and when the graph execution unit accesses a graph stored in the storage, node sampling or embedding sampling may be directly performed.

The graph storage unit may be further configured to, when storing a graph structure included in the graph data set, classify an index of each node as H-type when the number of neighbors of the node is greater than or equal to a preset number, classify the index of the node as L-type when the number of neighbors of the node is less than the preset number, generate a graph bitmap in which the classified indices are stored as metadata, and generate a mapping table in which a logical page number is assigned to the index of each node.

The graph execution unit may be further configured to directly access the graph data set stored in the storage through the interface provided by the graph storage unit when executing the data flow graph having the preset format.

According to another embodiment of the disclosure, a computational storage supporting graph machine learning acceleration includes: a solid state drive (SSD) configured to store a graph data set; and a field-programmable gate array (FPGA) configured to download, to a memory, a graph machine learning model programmed in a form of a data flow graph by a host, wherein a hardware logic built in the FPGA performs access to the SSD through a peripheral component interconnect-express (PCIe) switch, and the FPGA is divided into a first area and a second area, wherein the first area has a fixed hardware logic, the second area is a dynamically programmable area, and the first area and the second area are provided with a coprocessor port and a system bus lane to program a user-defined bit file in the second area.

According to another embodiment of the disclosure, a method of supporting graph machine learning acceleration on a computational storage includes: storing a graph data set in a storage; and downloading, by an operation unit, to a memory a graph machine learning model programmed in a form of a data flow graph by a host, wherein a hardware logic built in the operation unit performs access to the storage through a peripheral component interconnect-express (PCIe) switch, and the operation unit is divided into a first area and a second area, wherein the first area has a fixed hardware logic, the second area is a dynamically programmable area, and the first area and the second area are provided with a coprocessor port and a system bus lane to program a user-defined bit file in the second area.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings.

An embodiment of the disclosure relates to a computational storage supporting graph machine learning acceleration.

Figure 1:
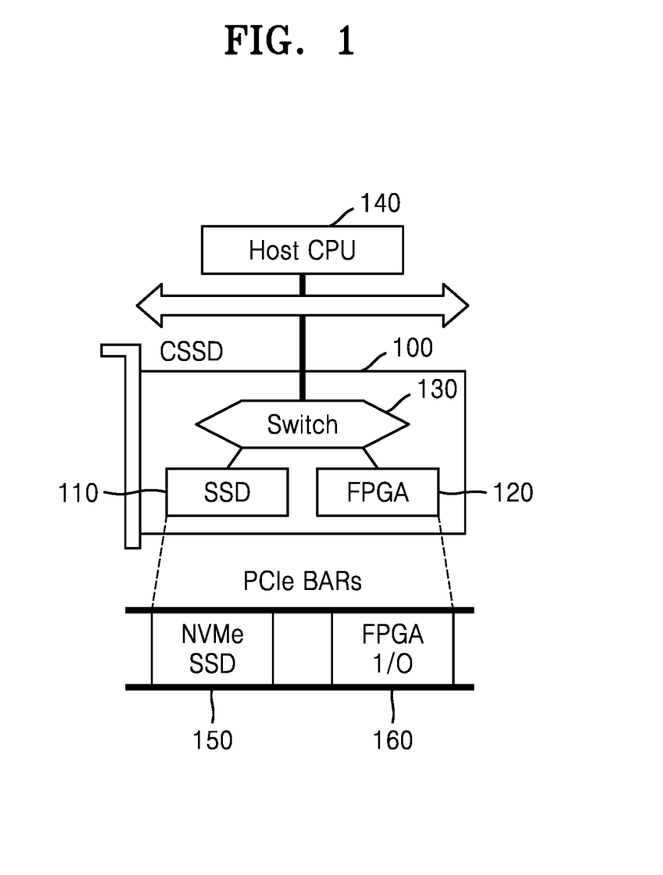
FIG. 1 illustrates an example of a structure of a computational storage supporting graph machine learning acceleration, according to an embodiment.

FIG. 1 illustrates an example of a structure of a computational storage supporting graph machine learning acceleration, according to an embodiment.

A computational storage, i.e., a computational solid state drive (computational SSD (CSSD)) 100, according to an embodiment includes an SSD 110 and a field-programmable gate array (FPGA) 120. The FPGA 120 is disposed near the SSD 110, and a hardware logic built in the FPGA 120 accesses the SSD 110 through a switch 130. An example of the switch 130 is a peripheral component interconnect-express (PCIe) switch.

In the CSSD 100 according to the embodiment, as the FPGA 120 is disposed near the SSD 110 to eliminate the process of moving large-scale graph data, not only a graph neural network (GNN) inference process but also a GNN preprocessing process may be accelerated when performing GNN machine learning.

An example of an interface between a host central processing unit (CPU) 140 and the CSSD 100 is PCIe. The host CPU may access a non-volatile memory (NVMe) SSD 150 or an FPGA input/output (I/O) 160 by using PCIe base address registers (PCIe BARs) of the CSSD 100 mapped to a system memory map. In this case, because the SSD 110 and the FPGA 120, which are internal hardware of the CSSD 100, are separated from each other, the input/output of the NVMe SSD 150 is requested through a PCIe BAR of the SSD 110, and the input/output of the FPGA I/O 160 is requested through a PCIe BAR of the FPGA 120. The SSD 110 and the FPGA 120 are placed in the same PCIe card.

Figure 2:
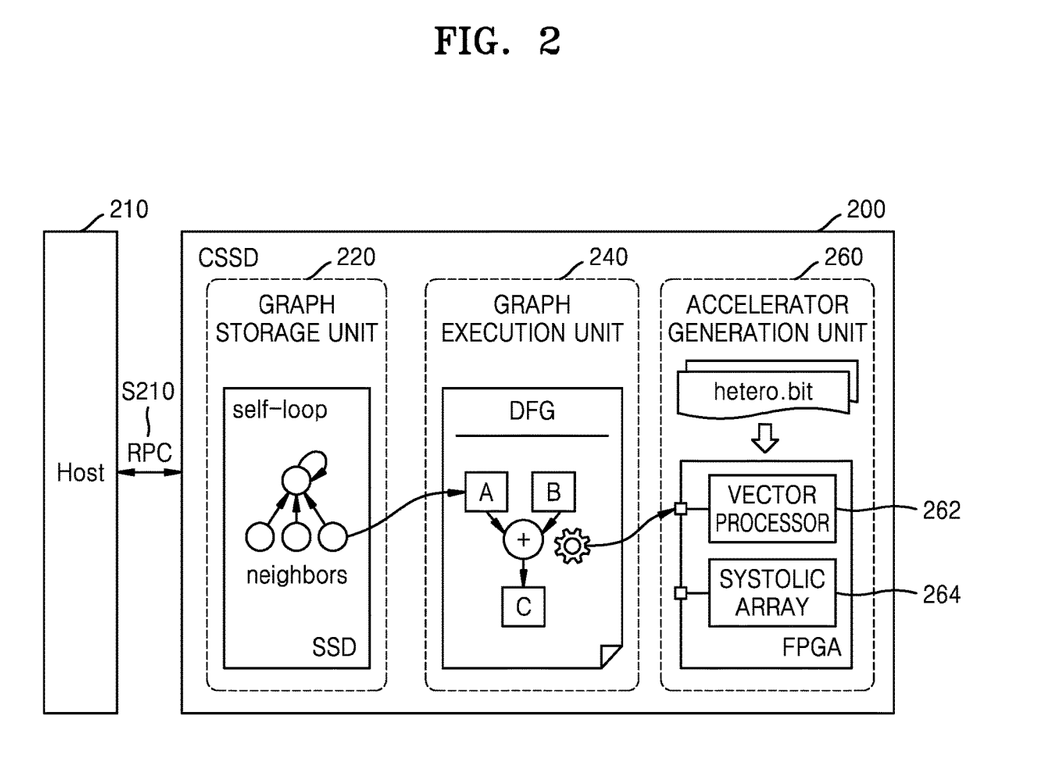
FIG. 2 is an internal configuration diagram of a computational storage supporting graph machine learning, acceleration according to an embodiment.

FIG. 2 is an internal configuration diagram of a CSSD supporting graph machine learning acceleration, according to an embodiment.

In a CSSD 200 according to an embodiment, a programmable operation unit is placed near a storage. An example of the storage is an SSD, and an example of the programmable operation unit is an FPGA. The CSSD 200 receives a graph data set and a GNN model and outputs a GNN inference result.

To this end, the CSSD 200 includes a graph storage unit 220, a graph execution unit 240, and an accelerator generation unit 260. The CSSD 200 communicates with a host 210 by using a remote procedure call (RPC) function. The host 210 may reference and update a graph data set, execute a graph machine learning operation, generate a custom accelerator, and register a custom operation through an RPC. In this case, the graph storage unit 220 of the CSSD 200 performs reference and update of the graph data set, the graph execution unit 240 executes the graph machine learning operation and registers the custom operation, and the accelerator generation unit 260 generates the custom accelerator.

The functions of the RPC used in the CSSD 200 are shown in Table 1.

TABLE 1

| Service Type | RPC function | Service Type | RPC function |
| --- | --- | --- | --- |
| Graph storage unit 220 (Bulk) | UpdateGraph (EdgeArray, Embeddings) | Graph storage unit 220 (Unit, Get) | GetEmbed(VID) GetNeighbors(VID) |
| Graph storage unit 220 (Unit, Update) | Addvertex(VID, Embed) DeleteVertex(VID) AddEgdt(dstVIC, srcVIC) DeleteEdge(dstVIC, srcVIC) UpdateEmbed(VIC, Embed) | Graph execution unit 240 Accelerator generation unit 260 | Run(DFG, batch) Plugin(shared_lib) Program(bitfile) |

The detailed operation of each remote procedure call is as follows.

UpdateGraph(EdgeArray, Embeddings): Store multiple edges (EdgeArray) and multiple feature vectors (Embeddings) in a graph storage at once.

AddVertex(VID, Embed): Store a new node whose feature vector is Embed and whose node index value is VID.

DeleteVertex(VID): Delete the feature vector and neighbor list of the node whose node index value is VID.

AddEdge(dstVID,srcVID), DeleteEdge(dstVID,srcVID): Add/delete an edge with srcVID as a source node index and dstVID as a destination node index.

UpdateEmbed(VID,Embed): Update the feature vector of the node whose node index value is VID to Embed.

GetEmbed(VID), GetNeighbors(VID): Refer to the feature vector/neighbor list of the node whose node index value is VID.

Run(DFG,batch): Execute a DFG model on a node index list (batch) that is a target of a graph machine learning operation.

Plugin(shared_lib): Register a user custom operation in the form of a shared library.

Program(bitfile): Program a bit file in a user area of an FPGA.

The graph storage unit 220 stores the graph data set in a storage or provides an interface for accessing the graph data set. The graph data set includes a graph structure and node embeddings. The graph storage unit 220 may store the graph data set in a storage by dividing the region thereof into a graph structure, an embedding table, and metadata. The embedding table stores the feature vector of each node. Feature vectors are stored in a continuous space in the order of node indices, whereas an adjacency list is stored in two ways described below by considering graph search and update efficiency.

When storing the graph structure included in the graph data set, the graph storage unit 220 simultaneously performs a process of converting a graph into an adjacency list, which is a graph structure that is easy to search for neighbors. Through this process, when the graph execution unit 240 accesses a graph stored in the storage, node sampling or embedding sampling may be directly performed.

Referring to FIGS. 3 to 6, when the graph storage unit 220 stores the graph structure included in the graph data set, the graph storage unit 220 classifies the index of each node as H-type when the number of neighbors of the node is greater than or equal to a preset number, and classifies the index of the node as L-type when the number of neighbors of the node is less than the preset number, and the classified indices are stored in a graph bitmap 310 in the form of metadata.

Figure 3:
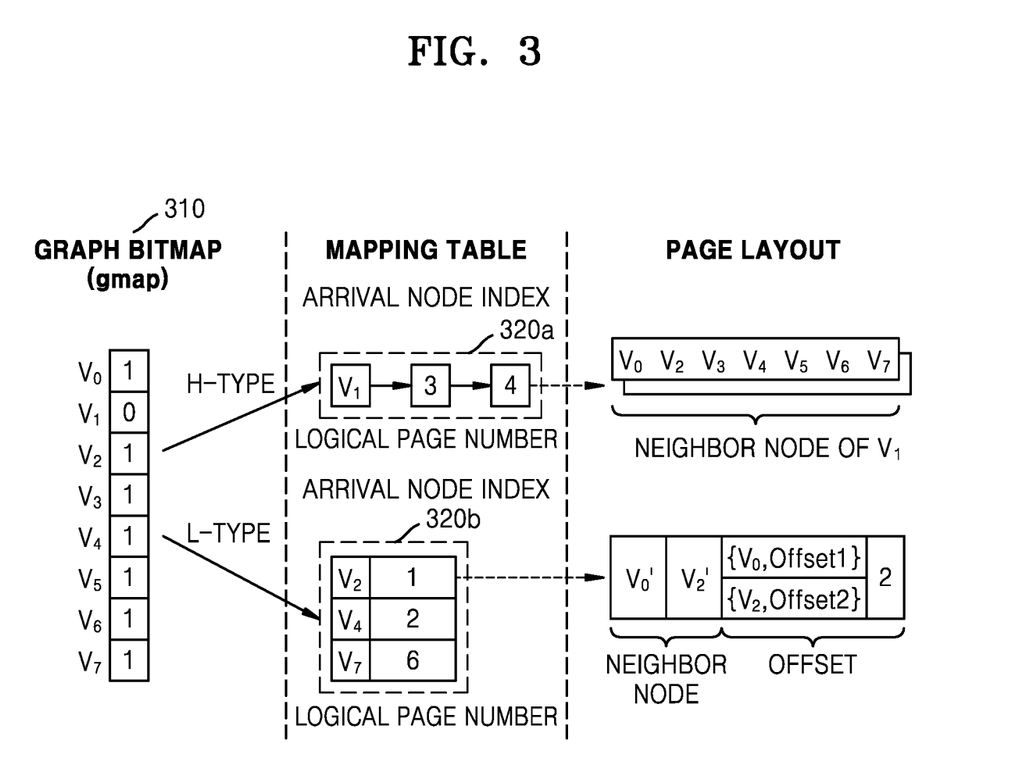
FIGS. 3 to 6 are diagrams for explaining the operation of a graph storage unit according to an embodiment.

The graph bitmap 310 is stored in a NAND memory inside the CSSD 200 in the form of metadata, but is cached and used by a dynamic random access memory (DRAM) during arithmetic processing. In the graph bitmap 310, $V_0$, $V_1$, . . . , and $V_7$ respectively represent the indices of nodes. '1' indicates L-type and '0' indicates H-type.

The graph storage unit 220 generates mapping tables 320a and 320b in which a logical page number is assigned to each of indices of nodes constituting the graph bitmap 310. In the case of L-type nodes having a smaller number of neighbors than a preset number, a neighbor list of multiple nodes may be stored in a single page. Accordingly, the indices of nodes in which L-type metadata is stored constitute a range-based mapping table 320b in which the neighbor list of multiple nodes is stored in a single page. H-type nodes with many neighbors each have more neighbors than a single page may store, and thus are stored across multiple pages. Accordingly, the indices of nodes in which H-type metadata is stored constitute a mapping table 320a in the form of a linked list.

The graph storage unit 220 performs a binary search of the mapping table 320b when searching for the neighbor list of the L-type nodes, and maps a page in which a neighbor list of a node having a certain arrival node index is stored. In addition, the graph storage unit 220 determines a location, in which a neighbor list of a desired node is stored, through the metadata of a corresponding page, and reads the neighbor list. The metadata of the corresponding page includes the number of neighbor lists stored in the page and offset information in the page. The offset information in the page is used to manage the start address of each neighbor list when a plurality of neighbor lists are stored in a single page.

The graph storage unit 220 may read a neighbor list by accessing a logical page address found while sequentially searching a mapping table having the form of a linked list when searching for the neighbor list of the H-type node. This is because, unlike the L-type, in which neighbor lists of several nodes are stored together in a single page, the neighbor list of the H-type uses a single page exclusively.

Figure 4:
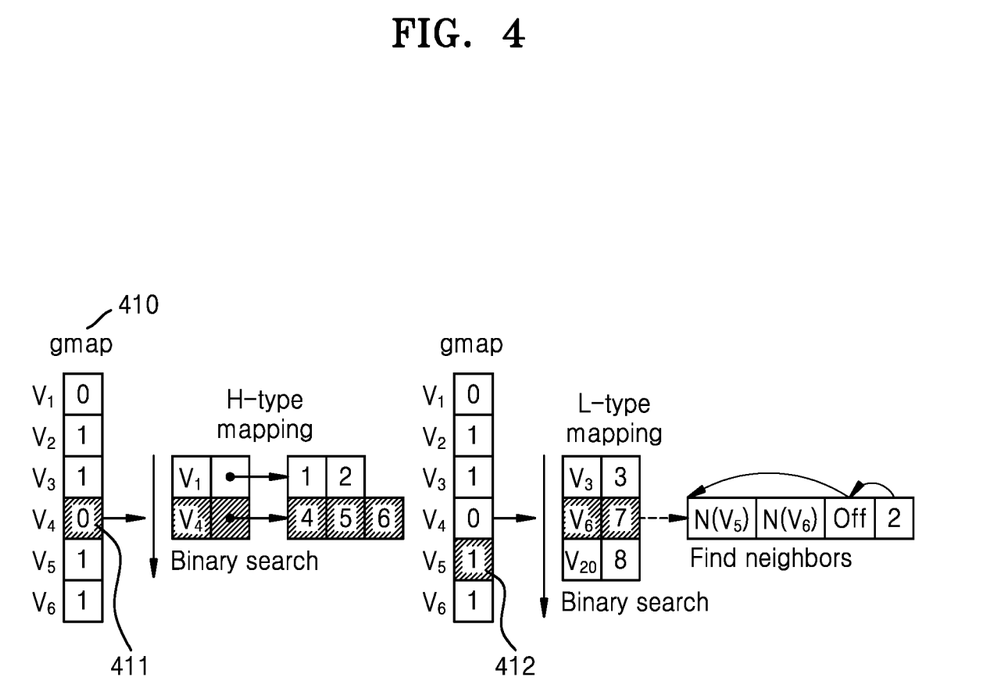
Figure 5:
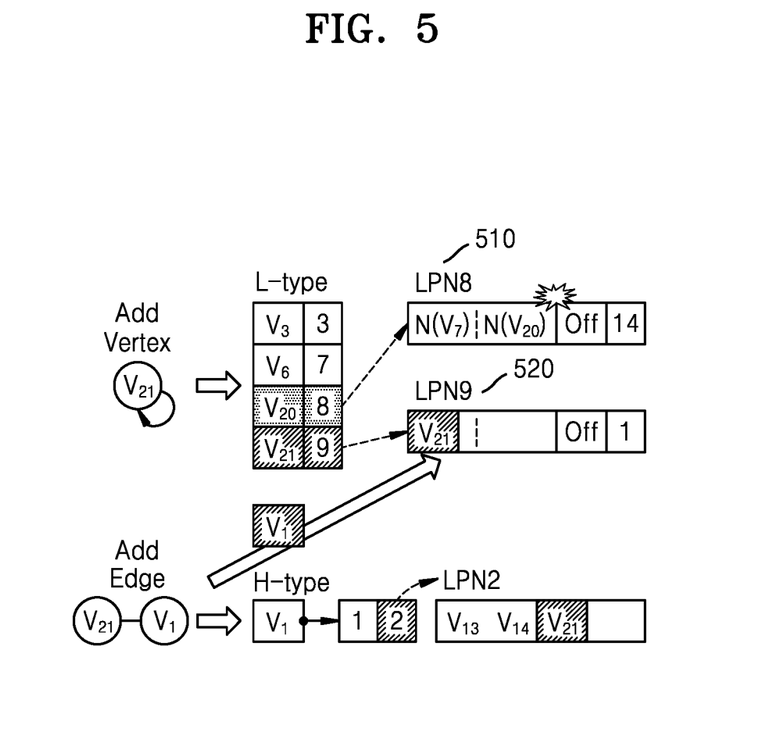

FIG. 4 illustrates a neighbor list reference operation of a remote call procedure application programming interface (API) provided by the graph storage unit 220, according to an embodiment. Both H-type and L-type may refer to mapping information of a target node index through binary search. However, unlike the H-type, which allocates the entire page to a single node, the L-type requires a range search because a single page is shared by multiple nodes. Because a mapping table stores the maximum node index included in an indicated page, it may be seen that, in the embodiment of FIG. 4, the neighbor list of a node $V_5$ is stored like a node $V_6$. Through the metadata of logical page 7, it may be seen that the neighbor lists of two nodes are stored in a corresponding page and the two nodes are $V_5$ and $V_6$. By referring to an offset where the neighbor list of the node $V_5$ is stored, it is finally possible to read the neighbor list of the node $V_5$ FIG. 5 illustrates a node addition operation of the remote call procedure API provided by the graph storage unit 220, according to an embodiment. In the case of a newly added node, because the number of neighboring nodes is one corresponding to itself, the newly added node is classified as an L-type. The graph storage unit 220 checks the metadata of a page pointed to by the last entry of an L-type mapping table and checks whether there is free space, and then when it is determined that there is no free space, the graph storage unit 220 expands the L-type mapping table after a new page is allocated. Specifically, because there is no free space in logical page 8, the neighbor list of a newly added node $V_{21}$ is stored in logical page 9. Thereafter, when a new neighbor $V_1$ is added to the node $V_{21}$, the node $V_1$ is added to the neighbor list of the node $V_{21}$ stored in the logical page 9, and the metadata of a corresponding page is updated.

Figure 6:
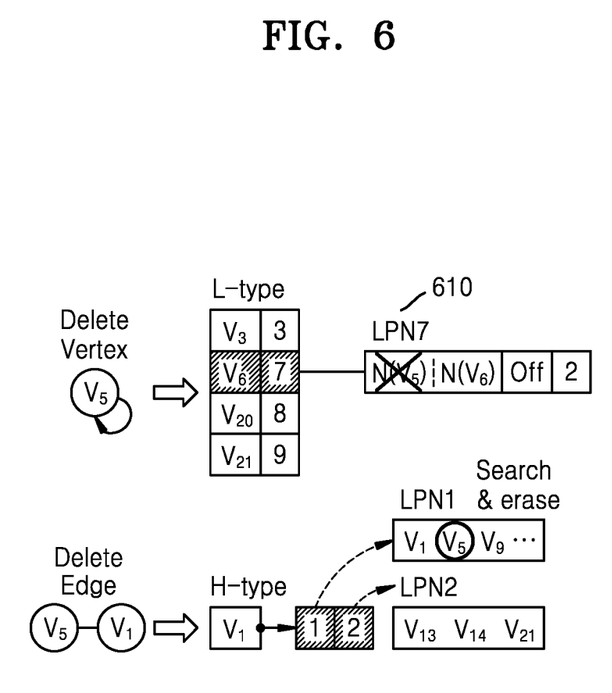

FIG. 6 illustrates in detail a node delete operation of the remote call procedure API provided by the graph storage unit 220, according to an embodiment.

The graph storage unit 220 deletes the neighbor list of a target node, and then performs the node delete operation through a process of deleting all edges connected to the target node. The embodiment of FIG. 6 illustrates a process of deleting a node $V_5$ that is an L-type node. The graph storage unit 220 reads the neighbor list of the node $V_5$ stored in the logical page 7. Thereafter, all edges connected to the node $V_5$ are deleted, and in this case, a process of searching for and deleting the node $V_5$ in the neighbor lists of all neighboring nodes of the node $V_5$ is repeated. After all edges connected to the node $V_5$ are deleted, the neighbor list of the node $V_5$ in the logical page 7 is deleted and related metadata is updated. The metadata is updated in a format (the number of neighbor lists stored in a page and offset information in the page). A process of deleting an H-type node is similar to this, but unlike the L-type, a process of deleting the neighbor list of a target node includes disconnecting a linked list to update mapping information.

Figure 7:
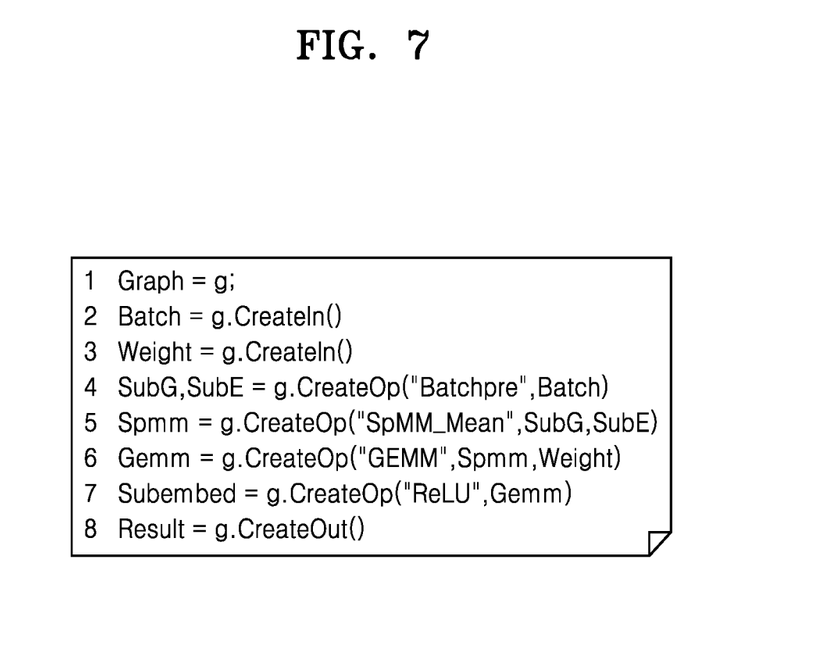
FIG. 7 illustrates an example of a graph machine learning model programmed in the form of a data flow graph, according to an embodiment.

The graph execution unit 240 receives a GNN program from the host 210 and outputs a GNN inference result. The operation of the graph execution unit 240 will be described with further reference to FIGS. 7 to 9. An example of the GNN program is a graph machine learning model programmed by the host 210 in the form of a data flow graph (DFG). FIG. 7 illustrates an example of programming in the form of DFG.

Figure 8:
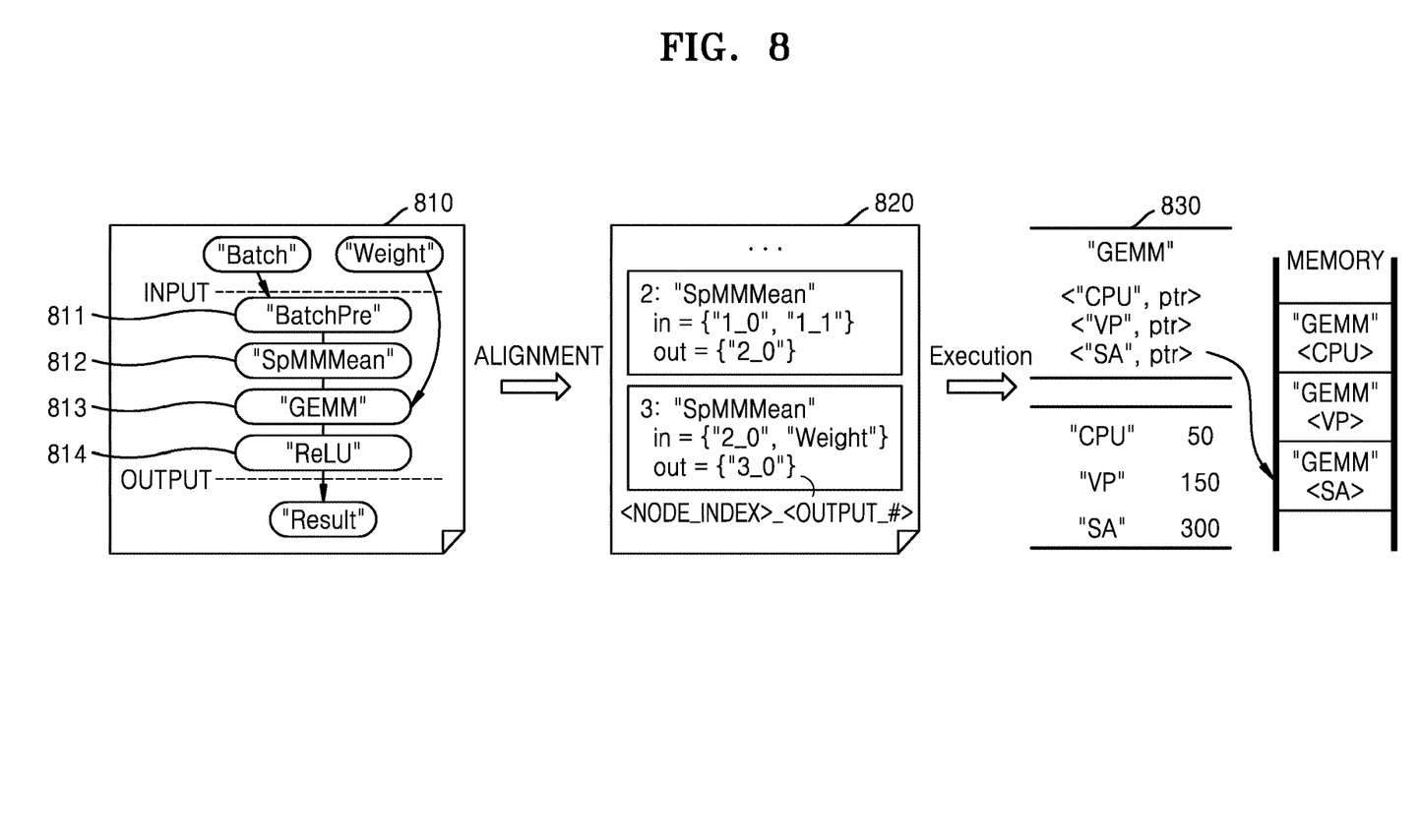
FIGS. 8 to 9 are diagrams for explaining the operation of a graph execution unit according to an embodiment.

The graph execution unit 240 converts a DFG 810 defined by a user into a DFG 820 having a preset format. For example, the graph execution unit 240 converts the DFG 810 defined by a user into the DFG 820 having a format in which the operation type, input value, and output value of each DFG node are predefined. Then, a DFG converted into a preset format is downloaded to a memory of the FPGA and then is executed to perform GNN preprocessing and GNN inference.

In an embodiment, a user may download the DFG to the CSSD 200 without cross-compilation and the modification of a storage stack by programming a graph machine learning model in a DFG format and execute the downloaded DFG.

Referring to FIG. 8, the graph execution unit 240 converts "BatchPre" 811, "SpMMMean" 812, "GEMM" 813, and "ReLU" 814 of the DFG 810 defined by a user into the DFG 820 having a preset format and then executes the DFG having a preset format. "BatchPre" 811 is an operation required for GNN preprocessing, and "SpMMMean" 812, "GEMM" 813, and "ReLU" 814 are operations required for GNN inference. In this process, the graph execution unit 240 directly accesses the storage in the CSSD 200 through the graph storage unit 220 to read a graph and embeddings.

In an embodiment, because the graph execution unit 240 stores a mapping table 830 that internally maps operation types and hardware codes in a memory such as DRAM, DFG programming is possible even when a user does not know the hardware inside. In addition, when multiple pieces of hardware may perform a single operation, hardware to execute the operation is determined based on priority.

Figure 9:
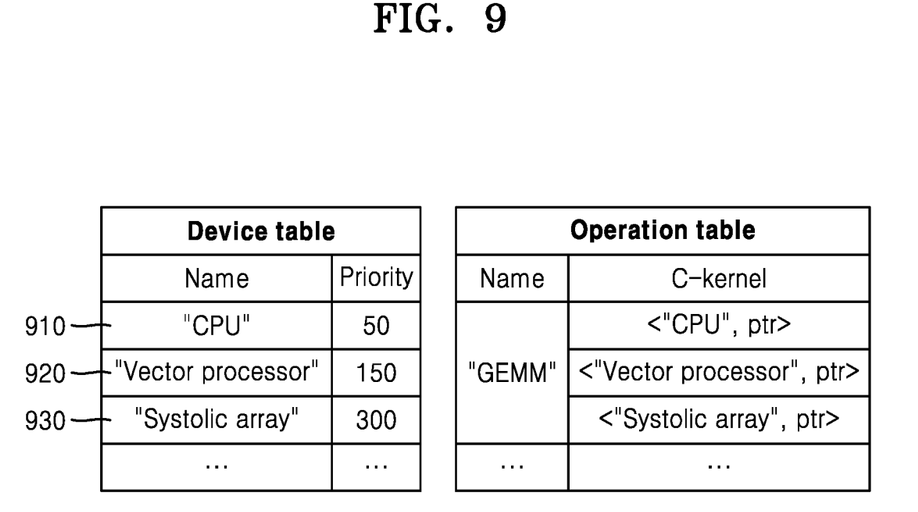

Referring to FIG. 9, when a single operation called "GEMM" may be performed by a CPU 910, a vector processor 920, and a systolic array 930, hardware to execute an operation is determined based on a preset priority for each device. "GEMM"<SA>(Systolic array) 930, "GEMM"<VP>(Vector Processor)(920), and "GEMM"<CPU>(910), which are codes that perform "GEMM" 813 in each hardware, are stored in a memory, and the code of hardware selected based on priority among them is executed. In this case, the graph execution unit 240 may perform acceleration in a corresponding device by changing a program counter to a hardware code memory address stored in a mapping table. Finally, the graph execution unit 240 performs acceleration by jumping the program counter to a hardware code memory address stored in the mapping table.

Figure 10:
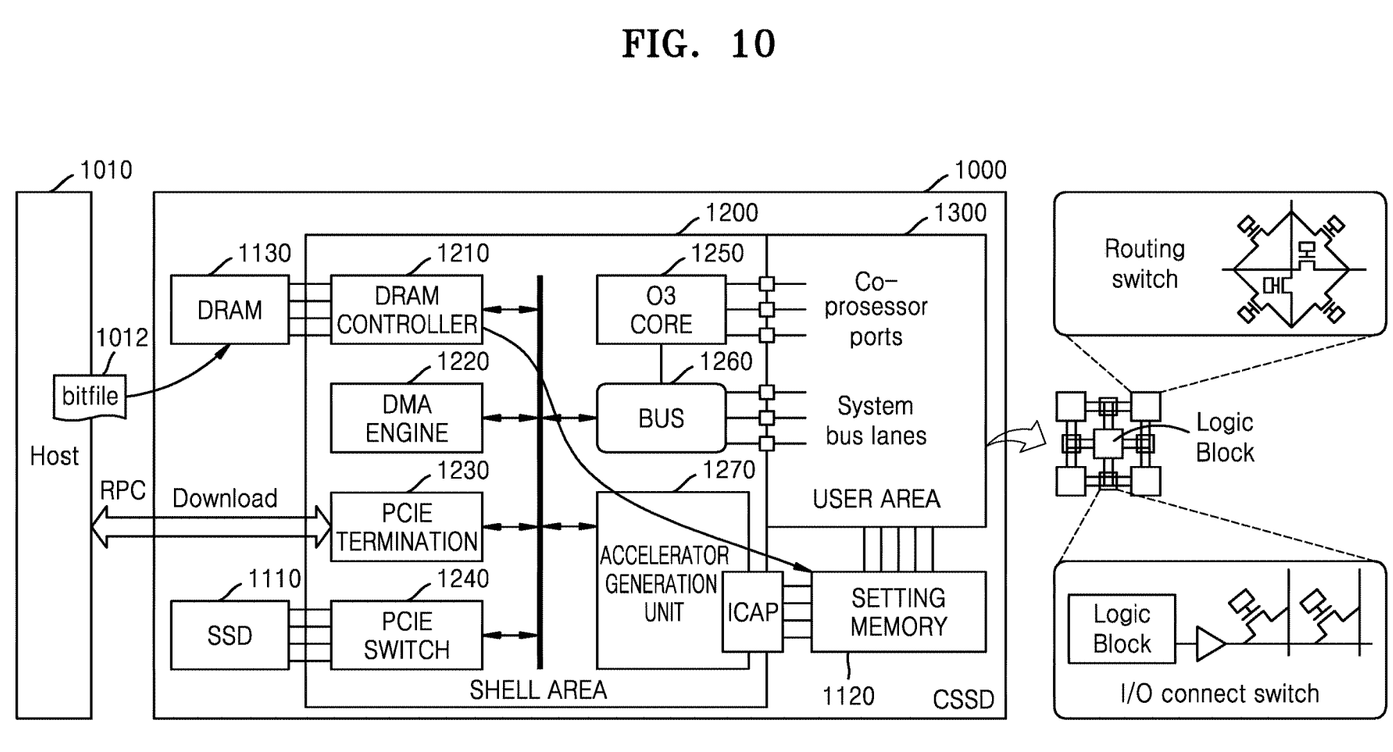
FIG. 10 is a diagram for explaining the operation of an accelerator generation unit according to an embodiment.

The accelerator generation unit 260 downloads a bit file 1012 from a host 1010 to a DRAM 1130 and then sets the value of a setting memory 1120 based on the bit file 1012 to generates a graph machine learning inference accelerator in an FPGA. The setting memory 1120 refers to an FPGA memory. The bit file 1012 refers to a hardware program file defined by a user.

In FIG. 10, an FPGA 1200 and 1300 may be divided into a shell area 1200 and a user area 1300. In this case, Dynamic Function eXchange (DFX) technology may be used. The DFX technology supports a partition boundary storage method and a dynamic programming method.

In the partition boundary storage method, a partition pin is defined between a fixed area and a dynamically programmable area in the form of a design checkpoint file. Users may design hardware that has the partition pin of the design checkpoint file as an input pin or output pin.

In the dynamic programming method, a user-defined bit file is programmed into an FPGA of a dynamically programmable area through an internal configuration access port (ICAP).

In an embodiment, the shell area 1200 is a fixed area and includes a hardware logic used when executing a graph storage unit, a graph execution unit, and an accelerator generation unit 1270. The hardware logic includes a DRAM controller 1210, a DMA engine 1220, a PCIe termination 1230, a PCIe switch 1240, an O3 core 1250, a bus 1260, and the like. The user area 1300 is an area in which a user may freely arrange a neural network accelerator for graph machine learning. The shell area 1200 and the user area 1300 are provided with a coprocessor port and a system bus lane, and thus, a user-defined bit file may be programmed in the user area 1300. For example, a bit file in the form of a vector processor 262 and a systolic array 264 may be programmed in the user area 1300, as shown in the embodiment of FIG. 2.

A user may define an operation executable in hardware in the user area 1300 through an API provided by the graph execution unit 240.

The device described above may be implemented as a hardware component, a software component, and/or a combination of a hardware component and a software component. For example, the devices and components described above in the embodiments may be implemented by using, for example, a processor, a controller, an arithmetic logic unit (ALU), a digital signal processor, a microcomputer, an FPGA, a programmable logic unit (PLU), a microprocessor, or one or more general purpose computers or special purpose computers, such as a certain device capable of executing instructions and responding thereto. A processing device may include an operating system OS, and perform one or more software applications performed on the OS. In addition, the processing device may also, in response to execution of the software, access, store, manipulate, process, and generate data. For convenience of understanding, although the processing device has been described for the case in which one processing device has been used, one of ordinary skill in the art may understand that the processing device may include a plurality of processing elements and/or multiple types of processing elements. For example, the processing device may include a plurality of processors or one processor and one controller. In addition, other processing configurations, such as a parallel processor, may also be feasible.

The software may include a computer program, code, an instruction, or a combination thereof, and may configure the processing device to operate as desired, or command the processing device independently or collectively. Software and/or data may, to be interpreted by a processing device or provide instructions or data to the processing device, be embodied in any type of machine, a component, a physical device, virtual equipment, a computer storage medium, or a computer device. Software may be distributed over a networked computer system, and may also be stored or executed in a distributed manner. Software and data may be stored in one or more computer-readable recording media.

The method according to the embodiment may be implemented in a form of program instructions executable by using various computer means, and may be recorded in a computer-readable medium. The computer-readable medium may include program instructions, data files, data structures, or the like, separately or in a combination thereof. The program instructions to be recorded on the medium may be those particularly designed and configured for the embodiments, or may also be available to one of ordinary skill in the art of computer software. Examples of the computer-readable recording media may include magnetic media, such as a hard disk, a floppy disk and magnetic tape, optical media, such as compact disk (CD)-read-only memory (ROM) (CD-ROM) and a digital versatile disk (DVD), magneto-optical media, such as a floptical disk, and hardware devices particularly configured to store and perform program instructions, such as ROM, random access memory (RAM), and a flash memory. Examples of program instructions may include machine language code, such as those generated by a compiler, as well as high-level language code, which is executable by a computer using an interpreter, etc.

According to one or more embodiments, a computational storage supporting acceleration may accelerate not only a GNN inference process but also a GNN preprocessing process when performing GNN machine learning as an FPGA is placed near an SSD to eliminate a process of moving large-scale graph data.

According to one or more embodiments, the computational storage supporting acceleration may provide a software framework that may easily program various graph machine learning models and a neural network acceleration hardware logic that may be freely changed by a user, and thus may quickly perform GNN inference.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A computational storage supporting graph machine learning acceleration, the computational storage comprising:
an operation unit disposed near a storage;
a graph storage unit configured to store a graph data set in the storage or provide an interface for accessing the graph data set and output the graph data set and metadata for managing the graph data set;
a graph execution unit configured to convert a graph machine learning model programmed by a host in a form of a data flow graph into a data flow graph having a preset format, download the data flow graph having the preset format to a memory of the operation unit, and execute the downloaded data flow graph to perform graph machine learning preprocessing and graph machine learning inference; and
an accelerator generation unit configured to download a bit file of the host, set a setting memory value based on the bit file to design a hardware logic of the operation unit, and generate a graph machine learning inference accelerator.

2. The computational storage of claim 1, wherein the operation unit is divided into a first area and a second area, and the first area and the second area are provided with a coprocessor port and a system bus lane to program the second area.

3. The computational storage of claim 2, wherein the first area is a fixed area and includes a hardware logic used when executing the graph storage unit, the graph execution unit, and the accelerator generation unit.

4. The computational storage of claim 2, wherein the second area is a dynamically programmable area, and a user defines, in the second area, an operation executable in hardware through the graph execution unit.

5. The computational storage of claim 1, wherein the hardware logic built in the operation unit accesses the storage through a peripheral component interconnect-express (PCIe) switch.

6. The computational storage of claim 1, wherein the graph storage unit is further configured to perform a process of converting a graph into a graph structure, which is easy to search for neighbors, when storing the graph included in the graph data set, and when the graph execution unit accesses a graph stored in the storage, node sampling or embedding sampling is directly performed.

7. The computational storage of claim 1, wherein, the graph storage unit is further configured to, when storing a graph structure included in the graph data set, classify an index of each node as H-type when the number of neighbors of the node is greater than or equal to a preset number, classify the index of the node as L-type when the number of neighbors of the node is less than the preset number, generate a graph bitmap in which the classified indices are stored as metadata, and generate a mapping table in which a logical page number is assigned to the index of each node.

8. The computational storage of claim 7, wherein the H-type is a type in which the number of neighbors of a node is greater than the number of neighbors to be stored in a single page, and indices of nodes in which H-type metadata is stored generate a mapping table in a form of a linked list.

9. The computational storage of claim 7, wherein the L-type is a type in which the number of neighbors of a node is less than the number of neighbors to be stored in a single page, and indices of nodes in which L-type metadata is stored generate a range-based mapping table in which a neighbor list of multiple nodes is stored in a single page.

10. The computational storage of claim 1, wherein the graph execution unit is further configured to directly access the graph data set stored in the storage through the interface provided by the graph storage unit when executing the data flow graph having the preset format.

11. The computational storage of claim 1, wherein the storage and the operation unit are disposed in a same PCIe card.

12. A computational storage supporting graph machine learning acceleration, the computational storage comprising:
a solid state drive (SSD) configured to store a graph data set;
a field-programmable gate array (FPGA) configured to download, to a memory, a graph machine learning model programmed in a form of a data flow graph by a host; and an accelerator generation unit configured to download a bit file of the host, set a setting memory value based on the bit file to design a hardware logic of the FPGA, and generate a graph machine learning inference accelerator, wherein the hardware logic built in the FPGA performs access to the SSD through a peripheral component interconnect-express (PCIe) switch, and the FPGA is divided into a first area and a second area, and wherein the first area has a fixed hardware logic, the second area is a dynamically programmable area, and the first area and the second area are provided with a coprocessor port and a system bus lane to program a user-defined bit file in the second area.

13. A method of supporting graph machine learning acceleration in a computational storage, the method comprising:

storing a graph data set in a storage;

downloading, by an operation unit, to a memory a graph machine learning model programmed in a form of a data flow graph by a host; and downloading, by an accelerator generation unit, a bit file of the host, setting a setting memory value based on the bit file to design a hardware logic of the operation unit, and generating a graph machine learning inference accelerator, wherein the hardware logic built in the operation unit performs an access to the storage through a peripheral component interconnect-express (PCIe) switch, and the operation unit is divided into a first area and a second area, and wherein the first area has a fixed hardware logic, the second area is a dynamically programmable area, and the first area and the second area are provided with a coprocessor port and a system bus lane to program a user-defined bit file in the second area.

14. The method of claim 13, wherein the operation unit is disposed near the storage.

15. The method of claim 13, wherein the first area is a fixed area and includes a hardware logic used when executing a graph storage unit, a graph execution unit, and the accelerator generation unit.

* * * * *